United States Patent
Merino Almeida et al.

(10) Patent No.: US 9,555,677 B1
(45) Date of Patent: Jan. 31, 2017

(54) APPARATUS FOR COVERING A HITCH RECEIVER

(71) Applicant: FORD GLOBAL TECHNOLOGIES, LLC, Dearborn, MI (US)

(72) Inventors: Carlos Emilio Merino Almeida, Benito Juarez (MX); Jonatan Leff Yaffe, Mexico City (MX); Jorge Manuel Rodriguez Vazquez, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/943,589

(22) Filed: Nov. 17, 2015

(51) Int. Cl.
*B60D 1/60* (2006.01)

(52) U.S. Cl.
CPC ....................... *B60D 1/60* (2013.01)

(58) Field of Classification Search
CPC ......................................... B60D 1/60
USPC ........................................ 280/507
See application file for complete search history.

(56) References Cited

U.S. PATENT DOCUMENTS

| | | | | |
|---|---|---|---|---|
| 2,230,373 A * | 2/1941 | Briggs | B60R 19/48 24/68 B |
| 2,342,907 A * | 2/1944 | Stall | B60D 1/60 280/501 |
| 2,521,356 A * | 9/1950 | Frederick | B60D 1/60 280/500 |
| 2,601,993 A * | 7/1952 | McCall | B60D 1/56 280/501 |
| 2,752,170 A * | 6/1956 | Eversole | B60D 1/60 280/502 |
| 2,789,854 A * | 4/1957 | Hope | B60R 19/38 293/111.1 |
| 3,623,764 A * | 11/1971 | Jacobus | B60J 5/103 16/232 |
| 3,716,254 A * | 2/1973 | Tarvin | B60R 3/02 280/166 |
| 3,774,949 A * | 11/1973 | Eger | B60R 19/48 280/491.4 |
| 3,814,461 A * | 6/1974 | Rhody | B60R 9/048 410/108 |
| 4,275,899 A * | 6/1981 | Humphrey | B60D 1/07 280/491.3 |
| 4,407,617 A * | 10/1983 | Hammonds | B62D 53/12 280/435 |
| 4,807,900 A * | 2/1989 | Tate | B60D 1/54 280/416.1 |
| 5,489,111 A * | 2/1996 | Collins | B60D 1/52 280/491.5 |
| 5,628,536 A | 5/1997 | Fulkerson | |
| 5,934,699 A * | 8/1999 | Blake | B60D 1/60 280/155 |
| 5,947,506 A | 9/1999 | Bauer | |

(Continued)

*Primary Examiner* — Joseph Rocca
*Assistant Examiner* — Conan Duda
(74) *Attorney, Agent, or Firm* — Jason Rogers; King & Schickli, PLLC (57) ABSTRACT

An apparatus is provided for covering a hitch receiver. That apparatus includes a rotating cover displaceable between a first position concealing a hitch receiver from view and a second position allowing access to the hitch receiver. In one embodiment the cover includes two cooperating lugs and pivots about two pivot pins. In another embodiment the cover slides along opposed guide channels.

6 Claims, 8 Drawing Sheets

(56) References Cited

U.S. PATENT DOCUMENTS

| | | | | |
|---|---|---|---|---|
| 5,979,953 A * | 11/1999 | Rinehart | ............... | B60R 19/48 293/106 |
| 6,019,386 A | 2/2000 | Morelock | | |
| 6,149,181 A * | 11/2000 | Biederman | ............ | B60D 1/485 280/491.1 |
| 6,189,910 B1 * | 2/2001 | Bartel | ................... | B60D 1/06 280/491.1 |
| 6,439,595 B1 | 8/2002 | Cheng et al. | | |
| 6,581,955 B2 * | 6/2003 | Aquinto | ............... | B60D 1/485 280/491.5 |
| 6,874,806 B1 | 4/2005 | Blake | | |
| 6,908,096 B2 | 6/2005 | Lewis et al. | | |
| 6,969,084 B2 | 11/2005 | Kaepp et al. | | |
| 6,971,663 B1 * | 12/2005 | Blake | ................... | B60D 1/60 280/155 |
| 7,434,825 B2 * | 10/2008 | Williams | ............... | B60R 3/02 280/163 |
| 7,891,714 B2 * | 2/2011 | Takemura | ............... | B60D 1/60 280/507 |
| 2004/0104557 A1 * | 6/2004 | Kaepp | ................... | B60D 1/485 280/495 |
| 2006/0028036 A1 * | 2/2006 | Chuang | ................... | B60R 9/06 293/117 |
| 2011/0026268 A1 * | 2/2011 | Omura | ............... | B29C 45/0025 362/548 |
| 2011/0133499 A1 * | 6/2011 | Hope | ................... | B60R 9/06 293/117 |
| 2012/0066979 A1 * | 3/2012 | Brown | ................... | B60R 19/48 49/463 |
| 2013/0147157 A1 * | 6/2013 | Lee | ................... | B60D 1/54 280/491.1 |
| 2013/0147214 A1 * | 6/2013 | Cha | ................... | B60R 19/48 293/106 |
| 2014/0299642 A1 * | 10/2014 | Schatz | ................... | B60R 9/06 224/496 |

* cited by examiner

APPARATUS FOR COVERING A HITCH RECEIVER

TECHNICAL FIELD

This document relates generally to the motor vehicle equipment field and, more particularly, to an apparatus for covering a hitch receiver.

BACKGROUND

Many individuals utilize their motor vehicles to tow trailers laden with such items as boats, personal watercraft, all-terrain vehicles, motorcycles, camping equipment and the like. Thus receiver-type trailer hitches have become increasingly popular and are now provided on all types of motor vehicles including not only pickup trucks but also sport utility vehicles, crossover vehicles, minivans, station wagons and even sedans. Typically the trailer hitch receivers are provided in a recess behind the motor vehicle bumper. A trailer hitch cover is provided over the trailer hitch receiver when not in use in order to increase visual styling and aesthetic appeal of the motor vehicle.

This document relates to a new and improved apparatus for covering a hitch receiver. That apparatus includes a rotating cover that is aesthetically pleasing and easy to operate.

SUMMARY

In accordance with the purposes and benefits described herein, an apparatus is provided for covering a hitch receiver. That apparatus comprises a rotary cover displaceable between a first position concealing a hitch receiver from view and a second position allowing access to the hitch receiver.

In one possible embodiment the cover includes a first lug having a first aperture and a pivot pin extending through the first aperture. The rotating cover pivots about the pivot pin when the cover is displaced between the first position and the second position. In one possible embodiment, the cover includes a first lug and a second lug spaced from the first lug. A first aperture is provided in the first lug and a second aperture is provided in the second lug. The two apertures are aligned so as to define a pivot axis. A first pivot pin is received in the first aperture and a second pivot pin is received in the second aperture. The rotating cover pivots about the pivot axis on the first and second pivot pins when the cover is displaced between the first position and the second position.

In one possible embodiment, the apparatus further includes a guide channel for receiving and holding the cover when the cover is in the second position. That guide channel has a shape substantially matching a shape of a cover whereby the cover follows the guide channel when displaced between first and second positions.

In accordance with an additional aspect, a motor vehicle is provided. That motor vehicle comprises a bumper fascia having a hitch opening and hitch receiver carried in a recess behind the bumper fascia and accessed through the hitch opening. Further, the motor vehicle includes a rotating cover displaceable between a first position closing the hitch opening and concealing the hitch receiver and a second position opening the hitch opening and allowing access to the hitch receiver.

In one possible embodiment the bumper fascia includes a pivot support and the cover is pivotally connected to the pivot support by a pivot pin.

In one possible embodiment the cover includes a first mounting lug having a first aperture and a second mounting lug having a second aperture. The first aperture and the second aperture are aligned and define a pivot axis. A first pivot pin is received in the first aperture and a second pivot pin is received in the second aperture. The cover is connected to the pivot support by the first pivot pin and the second pivot pin and the rotating cover pivots about the pivot axis when displaced between the first position and the second position.

In one possible embodiment, the bumper fascia includes a first guide channel and a second guide channel and the cover includes a first side margin and a second side margin. The first side margin is received in and slides through the first guide channel and the second side margin is received in and slides through the second guide channel when the cover is displaced between the first position and the second position. In one particularly useful embodiment, the first guide channel, the second guide channel, the first margin and the second margin all have identical profiles.

In the following description, there are shown and described several preferred embodiments of the apparatus and a motor vehicle incorporating that apparatus. As it should be realized, the apparatus and motor vehicle are capable of other, different embodiments and their several details are capable of modification in various, obvious aspects all without departing from the apparatus and motor vehicle as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus for covering a hitch receiver, as well as a motor vehicle incorporating such an apparatus, and together with the description serve to explain certain principles thereof. In the drawing figures.

Reference will now be made in detail to the present preferred embodiments of the apparatus and the motor vehicle, examples of which are illustrated in the accompanying drawing figures.

DETAILED DESCRIPTION

Figure 1:
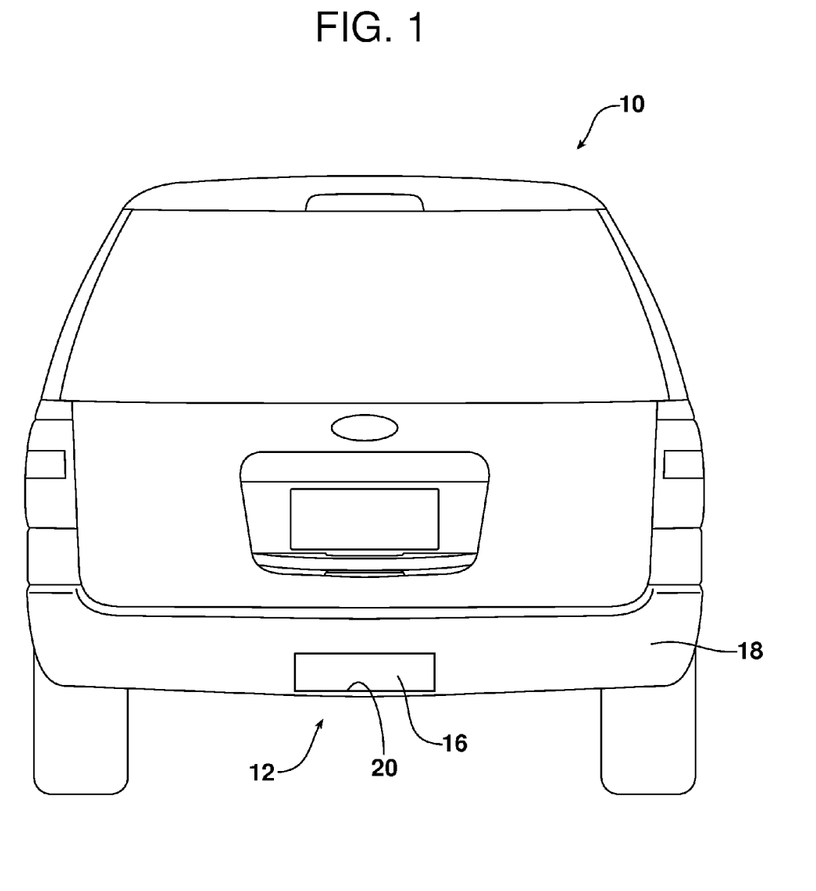
FIG. 1 is a rear elevational view of a motor vehicle incorporating an apparatus for covering a hitch receiver that illustrates a rotating cover of that apparatus in the closed position.
Figure 2:
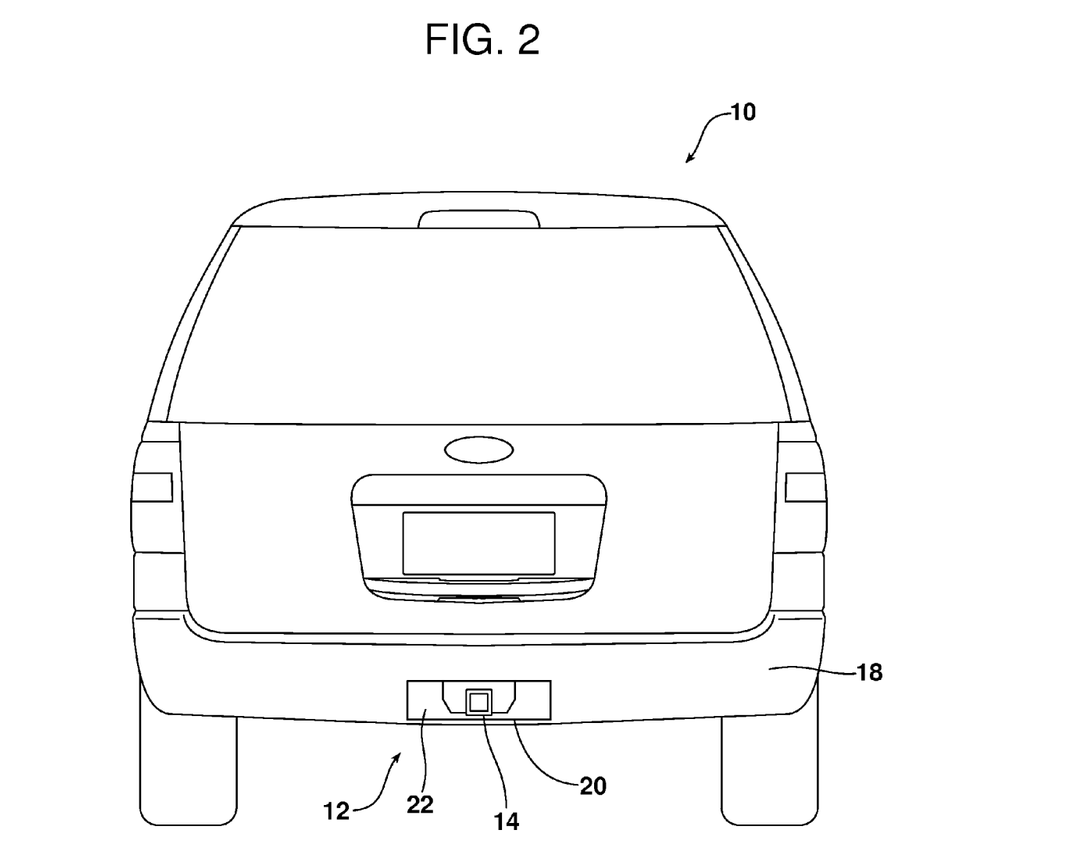
FIG. 2 is a view similar to FIG. 1 illustrating that apparatus with the rotating cover in an open position.

Reference is now made to FIGS. 1 and 2 illustrating a motor vehicle 10 incorporating an apparatus 12 for covering a hitch receiver 14. As illustrated, the apparatus 12 includes a rotating cover 16 displaceable between a first position, concealing the hitch receiver 14 from view, and a second position allowing access to the hitch receiver.

As illustrated, the motor vehicle 10 includes a bumper fascia 18 having a hitch opening 20. The hitch receiver 14 is carried in a recess 22 behind the bumper fascia 18 and is accessed through the hitch opening 20. In any of the embodiments described below, the rotating cover 16 is displaceable between the first or closed position illustrated in FIG. 1 wherein the hitch opening 20 is closed and the cover conceals the hitch receiver 14 and the second or open position illustrated in FIG. 2 wherein a hitch opening 20 is opened allowing access to the hitch receiver 14.

Figure 3A:
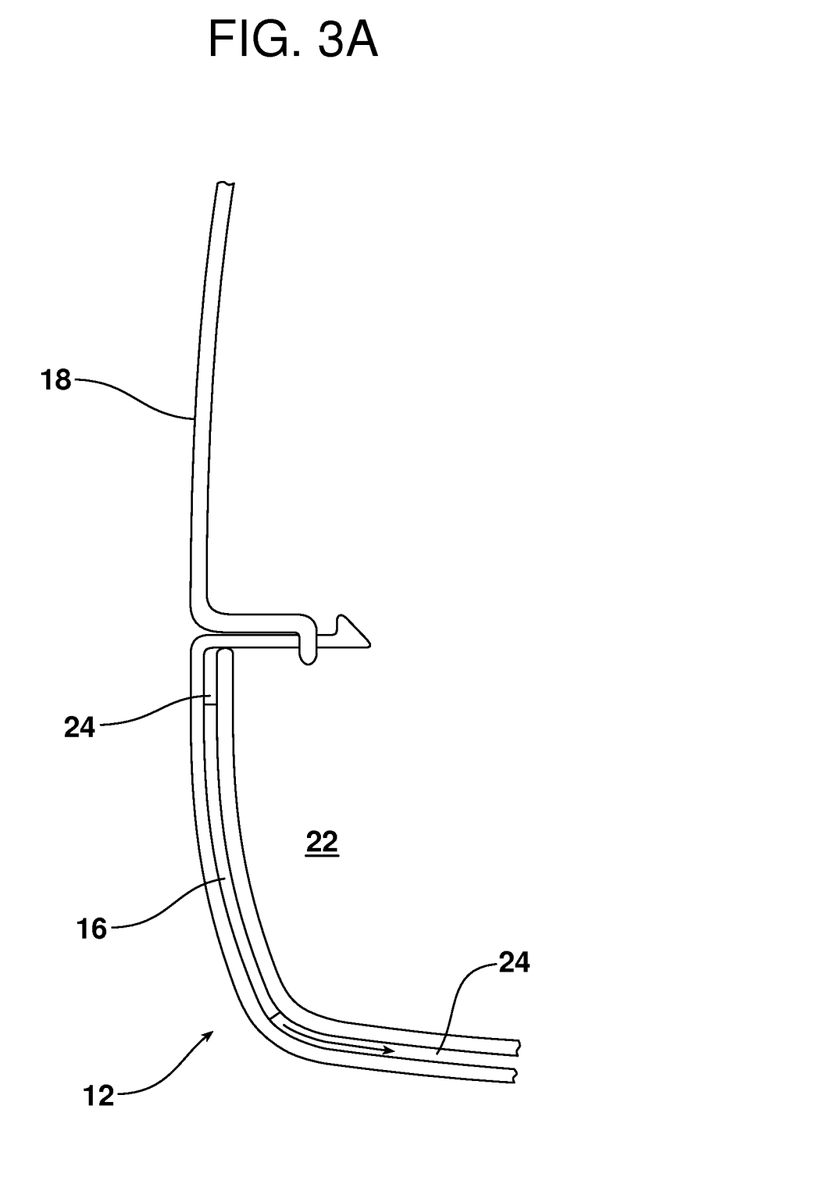
FIGS. 3A, 3B and 3C are schematic cross-sectional views illustrating a first embodiment of the apparatus including a rotating cover that is received and slides along opposed cooperating channels in the guide track.
Figure 3B:
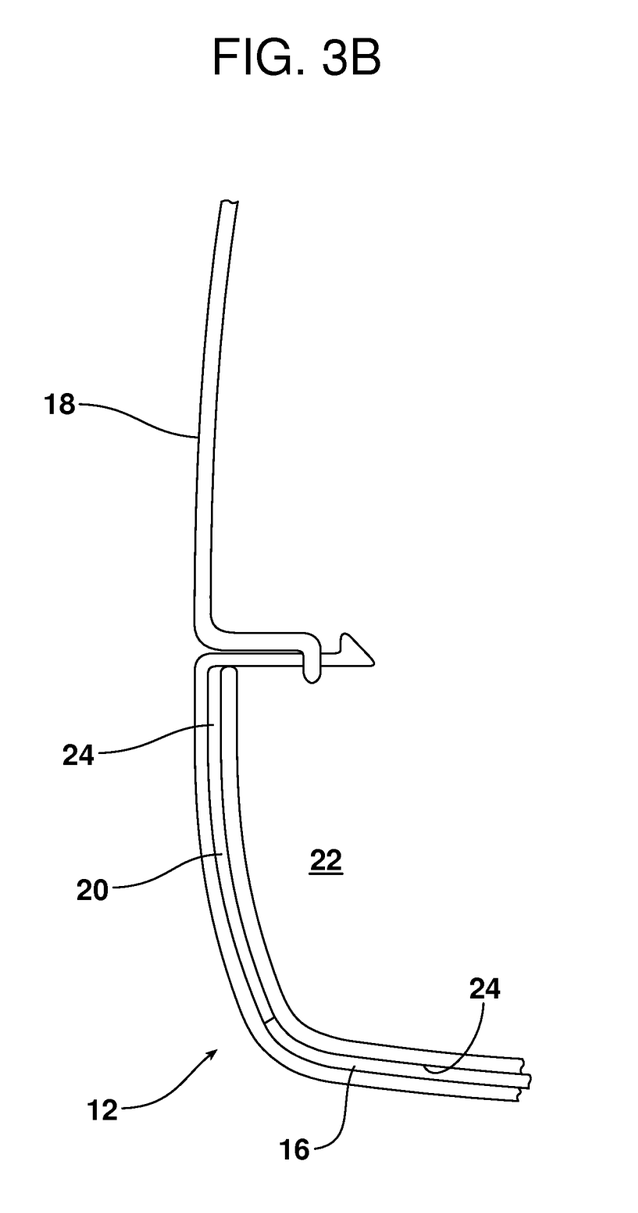
Figure 3C:
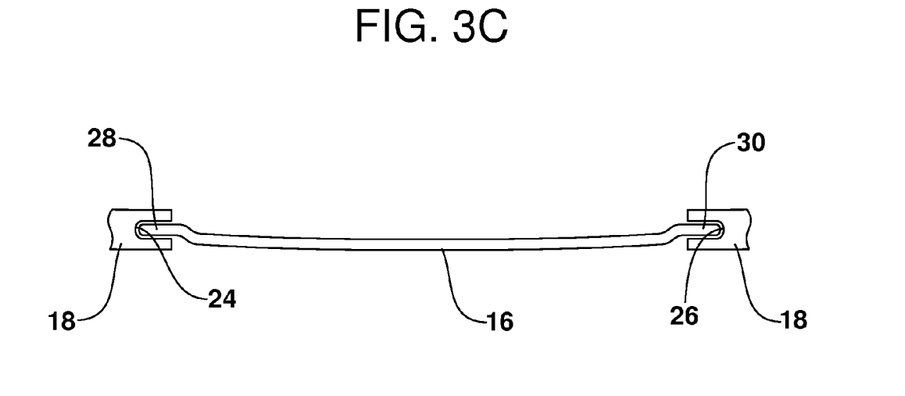

In the embodiment illustrated in FIGS. 3A-3C, the bumper fascia 18 includes a guide track comprising a first guide channel 24 and a second guide channel 26. As illustrated, the first guide channel 24 is opposed to the second guide channel 26.

The rotating cover 16 includes a first side margin 28 and a second side margin 30. The first side margin 28 is received in and slides along the first guide channel 24 while the second side margin 30 is received in and slides along the second guide channel 26. As should be appreciated, the rotating cover 16 is displaced between the closed position and the opened position by sliding along the guide channels 24, 26 provided in the bumper fascia 18.

In one possible embodiment, the rotating cover 16 is a rigid cover and the margins 28, 30 of that cover and the first and second guide channels 24, 26 all have identical profiles so that the rotating cover 16 slides freely and easily between the open and closed positions. In an alternative embodiment, the rotating cover 16 may comprise a plurality of hinged panels that remain connected together as the cover is displaced between the open and closed positions by sliding along the guide channels 24, 26.

Figure 4A:
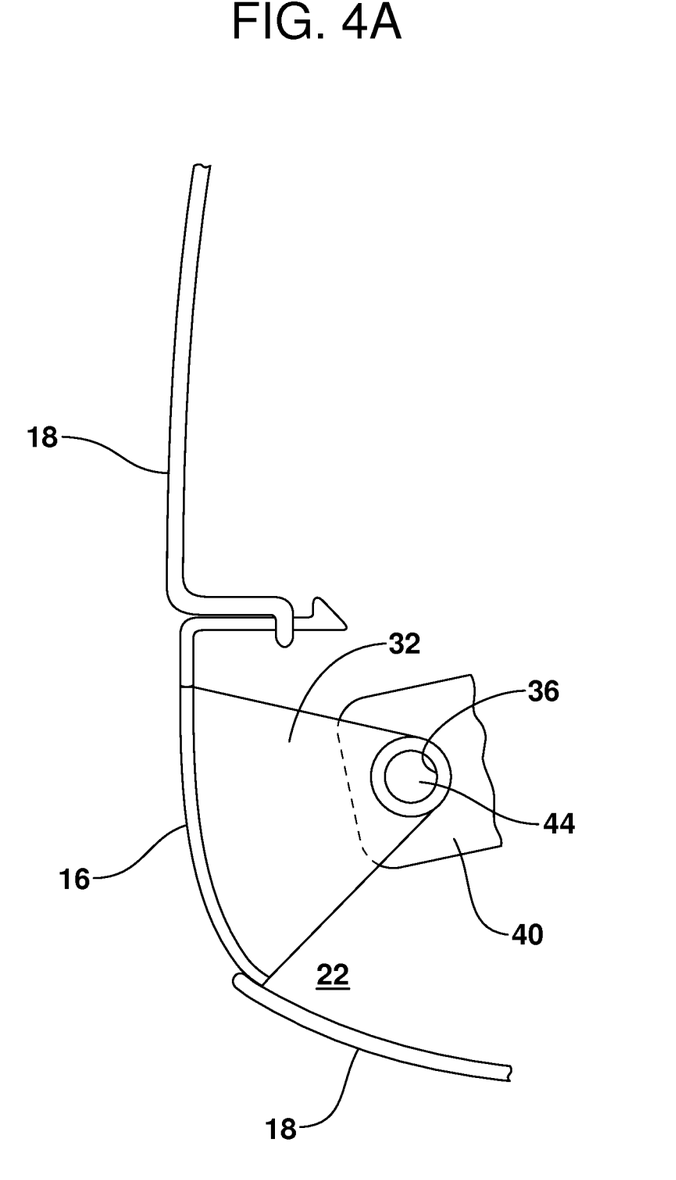
FIGS. 4A, 4B and 4C are schematic side views of a second embodiment of the apparatus including a rotating cover that pivots about a pivot pin.
Figure 4B:
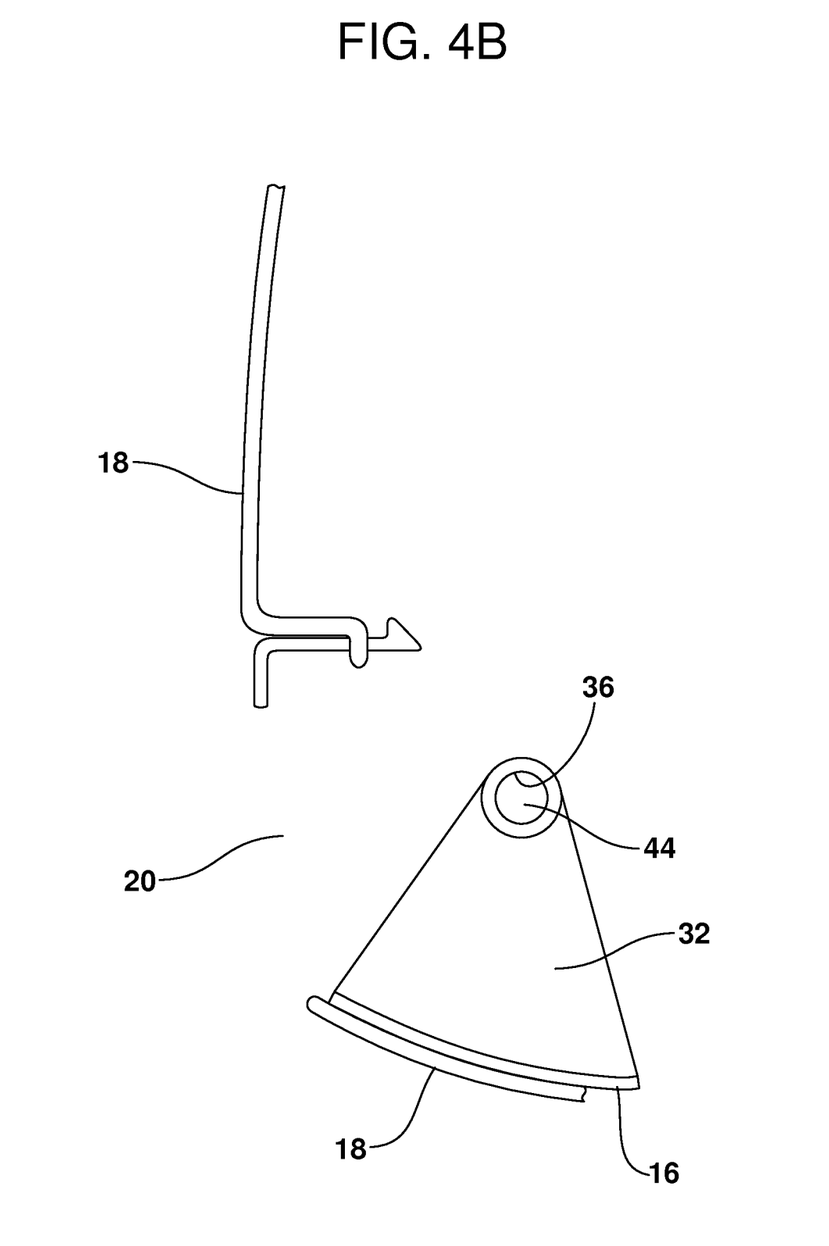
Figure 4C:
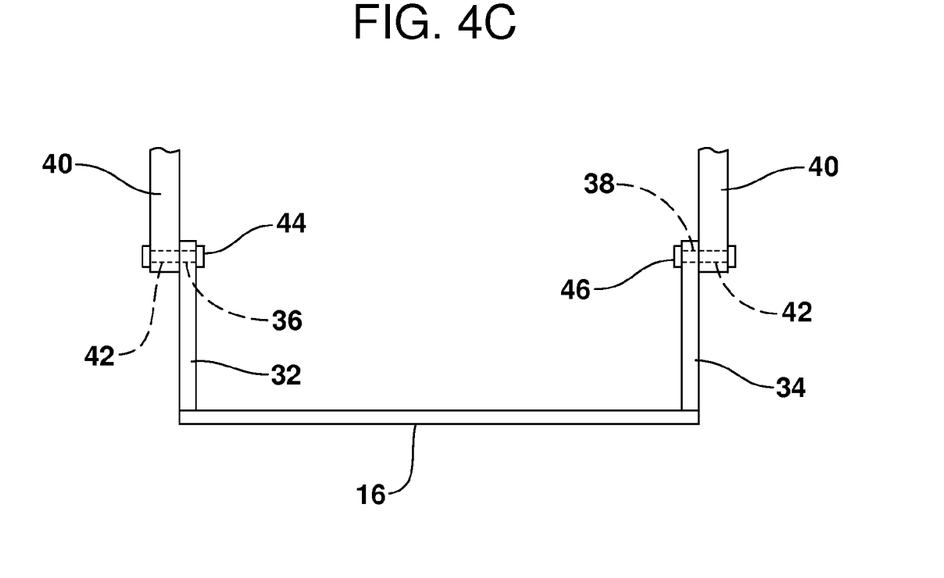

Reference is now made to FIGS. 4A-4C illustrating an alternative embodiment of the apparatus 12 wherein the rotating cover 16 includes first and second lugs 32, 34. A first aperture 36 is provided in the first lug 32 and a second aperture 38 is provided in the second lug 34.

A pivot support 40, connected to the vehicle frame, has two aligned apertures 42. A first pivot pin 44 is received in the first aperture 36 of the first lug 32 and one of the aligned apertures 42 of the pivot support 40. A second pivot pin 46 is received in the second aperture 38 of the second lug 34 and the other of the aligned apertures 42 in the pivot support 40. In this way, the rotating cover 16 is pivotally connected to the bumper fascia 18 whereby the cover pivots about the pivot axis defined by the aligned apertures 42 in the pivot support 40, the aligned apertures 36, 38 in the lugs 32, 34 and the pivot pins 44, 46 when displaced between the first or closed position and the second or open position.

In either of the embodiments illustrated in FIGS. 3A-3C and 4A-4C, the rotating cover 16 is held within the bumper fascia 18 when opened to provide access to the hitch receiver 14. There the cover 16 is protected from wind, dirt and debris while the hitch receiver is in use.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for covering a hitch receiver carried in a recess behind a bumper fascia, comprising:
   a rotating cover rotatable between a first position concealing a hitch receiver from view and a second position allowing access to said hitch receiver, wherein said rotating cover includes a first lug having a first aperture and a first pivot pin extending through said first aperture, said rotating cover pivoting about said first pivot pin when said rotating cover is rotated between said first position and said second position and wherein a majority of said rotating cover is held within the bumper fascia in the second position.

2. The apparatus of claim 1, wherein said rotating cover includes (a) a second lug spaced from said first lug, (b) the first aperture in said first lug aligned with a second aperture in said second lug so as to define a pivot axis and (c) the first pivot pin received in said first aperture and a second pivot pin received in said second aperture, said rotating cover pivoting about said pivot axis on said first pivot pin and said second pivot pin when said rotating cover is rotated between said first position and said second position.

3. A motor vehicle, comprising:
   a bumper fascia having a hitch opening and a pivot support;
   a hitch receiver carried in a recess behind said bumper fascia and accessed through said hitch opening; and
   a rotating cover rotatable between a first position closing said hitch opening and concealing said hitch receiver and a second position opening said hitch opening and allowing access to said hitch receiver, wherein a majority of said rotating cover is held within the bumper fascia in the second position.

4. The motor vehicle of claim 3, wherein said rotating cover is pivotally connected to said pivot support by a pivot pin.

5. The motor vehicle of claim 3, wherein said rotating cover includes a first mounting lug having a first aperture and a second mounting lug having a second aperture and wherein said first aperture and said second aperture are aligned and define a pivot axis.

6. The motor vehicle of claim 5, further including a first pivot pin received in said first aperture and a second pivot pin received in said second aperture, said rotating cover being connected to said pivot support by said first pivot pin and said second pivot pin and said rotating cover pivoting about said pivot axis when rotated between said first position and said second position.

\* \* \* \* \*